United States Patent
Measom

(10) Patent No.: US 6,622,616 B1
(45) Date of Patent: Sep. 23, 2003

(54) POULTRY ROASTER

(75) Inventor: Ty Measom, Logan, UT (US)

(73) Assignee: Dutro Company, Logan, UT (US)

( * ) Notice: Subject to any disclaimer, the term of this patent is extended or adjusted under 35 U.S.C. 154(b) by 0 days.

(21) Appl. No.: 10/299,573

(22) Filed: Nov. 18, 2002

(51) Int. Cl.⁷ ............................ A23L 1/00; A47J 37/00; A47J 37/04; A47J 43/18
(52) U.S. Cl. ............................ 99/345; 99/347; 99/415; 99/417; 99/418; 99/419; 99/426; 99/446; 99/447; 99/450
(58) Field of Search ..................... 99/330, 339, 340, 99/345–347, 410–418, 419–421 V, 425, 426, 400, 401, 444–450, 481, 482; 211/181.1; 426/509, 523; 126/25 R, 25 NA, 9 R, 41 R

(56) References Cited

U.S. PATENT DOCUMENTS

| | | | | |
|---|---|---|---|---|
| 1,339,625 A | * | 5/1920 | Holloway | 99/345 |
| 1,969,601 A | * | 8/1934 | Foch | 99/419 |
| 2,111,456 A | * | 3/1938 | Markle, Jr. | 99/419 |
| 2,350,623 A | * | 6/1944 | Kruea | 99/345 |
| 3,713,378 A | * | 1/1973 | West et al. | 99/346 |
| 3,922,960 A | * | 12/1975 | Lewis | 99/346 |
| 4,066,010 A | * | 1/1978 | Larsson | 99/346 |
| 4,633,773 A | * | 1/1987 | Jay | 99/426 |
| 4,709,626 A | * | 12/1987 | Hamlyn | 99/426 |
| 5,069,117 A | * | 12/1991 | Schlessel | 99/419 |
| 5,575,198 A | * | 11/1996 | Lowery | 99/426 |
| 5,893,320 A | * | 4/1999 | Demaree | 99/419 |
| 5,996,572 A | | 12/1999 | Ilagan | 126/25 |
| 6,119,585 A | | 9/2000 | Guidry | 99/345 |
| 6,125,739 A | | 10/2000 | Jernigan | 99/345 |
| 6,272,976 B1 | | 8/2001 | Berryman | 99/340 |
| 6,502,501 B1 | * | 1/2003 | Simon | 99/345 |

* cited by examiner

Primary Examiner—Timothy F. Simone
(74) Attorney, Agent, or Firm—Harris Zimmerman

(57) ABSTRACT

A poultry roaster for use on top of a gas-fired cooker includes a barrel-shaped cover that designed to resemble a beer keg and a carrying handle which resembles a pair of oppositely facing beer taps. An open bottom of the cover closely fits to a bottom pan having a plurality of upwardly punched lower heat distribution holes. The cover is retained to the bottom pan by a pair of latch hooks and mating headed pins. A heat deflector includes a circular plate for supporting a basting adapter, and a downwardly dependent annular rim which closely engages the bottom pan. The circular plate includes a plurality of upper heat distribution holes. A heat diffuser chamber formed between the bottom pan and the heat deflector provides even heat flow to an inner cooking chamber of the cover. A single basting adapter for supporting a single larger sized fowl, such as a turkey, in an upright position during cooking includes a horizontally disposed circular base plate securable to the circular plate, and a plurality of upwardly dependent can retainer rods supporting a centrally located upper ring sized to receive a can of beer to be inserted into the body cavity of the whole fowl prior to cooking the fowl. A tri-basting adapter allows three smaller sized whole fowl such as whole chickens, pheasants, and the like to be cooked in the same manner simultaneously.

19 Claims, 5 Drawing Sheets

POULTRY ROASTER

BACKGROUND OF THE INVENTION

1. Field

Figure 1:
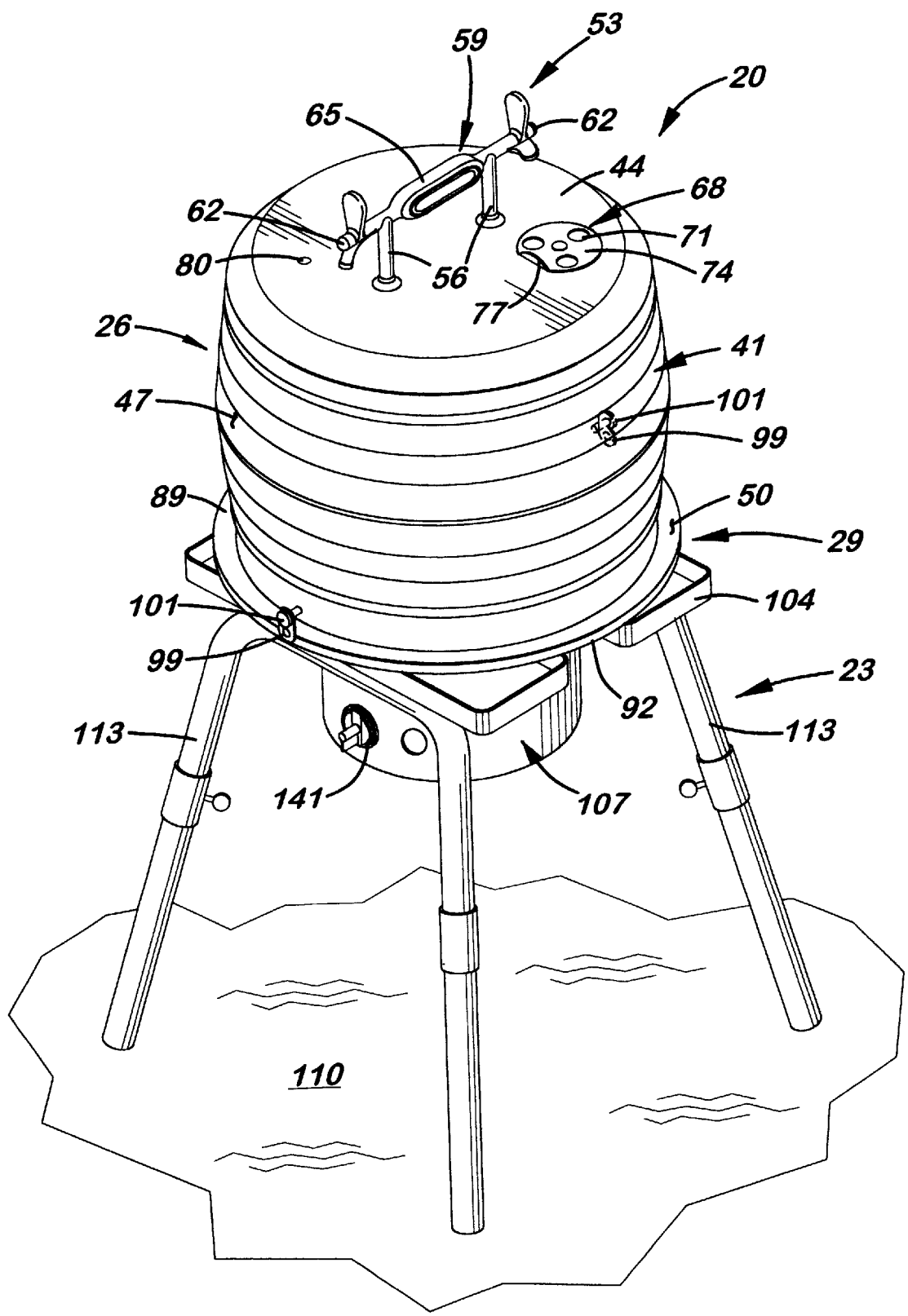

The present invention relates to poultry cookers for steaming and roasting poultry such as whole turkeys, chickens, and other fowl, and more specifically to poultry cookers which are heated by charcoal or gas-fired grills which cook poultry using steam to keep the cooking meat moist and seasoned by vapors from a desired basting liquid.

2. State of the Art

People have become more conscious of their health over the last decade or two, watching closer the calories, fat, and cholesterol of the foods they eat. One result has been the switching from the "red meat" of cows to the healthier "white meats" of poultry such as turkey and chicken, but also duck, pheasant, and other such fowl. Whole fowl are typically cooked indoors in a conventional convection oven, with a body cavity resulting from removal of the internal organs stuffed with bread stuffing, and then covered with aluminum foil. The moist stuffing and the outer covering of aluminum foil help to retain the natural juices of the fowl from evaporating, resulting in moister cooked meat. The aluminum foil is typically removed for a few minutes prior to removing the fowl from the oven to allow browning of the exterior of the fowl to crisp the skin and provide a more appealing look for serving.

Cooking whole fowl outdoors such as barbecuing on a charcoal grill or a gas-fired cooker (e.g. a gas-fired grill) has proven to be more challenging than cooking indoors primarily due to the lesser controllability of the cooking temperature, and the variability of the temperature at various areas particularly over the charcoal grill. A motorized rotisserie is often employed to horizontally rotate the fowl above the charcoal to more evenly cook the fowl. Some chefs brush the fowl with flavored liquid, liquified butter, or other basting liquid in an attempt to prevent burning and drying out of the meat during cooking. While such basting of the fowl with liquid helps the meat retain moisture and more evenly cook, basting requires frequent attention to the fowl and is thus inconvenient. More typically, the fowl is left to cook alone, and is checked only after a predetermined amount of time has elapsed. This results either in the fowl being cooked too long resulting in dry, tasteless meat with portions of the fowl burned, or the fowl being removed from the grill earlier and with portions of the meat undercooked. The undercooked fowl is particularly bad since salmonella and other such bacteria which are not killed due to insufficient exposure to heat can cause sickness or even death when eaten. A gas-fired cooker gives the chef more control over the heat input by allowing regulating of the flow of gas, and a more even heat due to the lack of using burning charcoal as the source of heat. However, the results are still not necessarily satisfactory.

There are numerous patents on various devices designed for cooking poultry outdoors on grills and gas-fired cookers. One example is the cooking apparatus for roasting and grilling foodstuffs disclosed in U.S. Pat. No. 6,119,585 issued to Guidry. The cooking apparatus is designed for grilling whole chickens and other fowl on top of an open-topped charcoal or gas-fired grill while maintaining the meat moist and permitting desired flavorings to be imparted to the meat. The cooking apparatus includes one or a plurality of upstanding metal tubes affixed to a horizontally disposed metal base plate. The base plate seals a lower end of the tube while a beveled upper end thereof is open for adding basting liquid. A desired flavoring basting liquid is poured into the tube and the whole fowl is impaling on the beveled upper end. The cooking apparatus with impaled fowl is placed on a cooking surface of the grill above the burning charcoal. The flavored basting liquid evaporates during cooking of the chicken to moisten and flavor the meat. Heat is conducted through the tube to the interior of the fowl to produce more even cooking. The base plate partially shields the chicken from direct heat and flames from the charcoal to minimize searing and burning of the chicken. While the cooking apparatus attempts to keep the meat moist using vapor internally introduced to the fowl and partially shielded from excessive heat, it fails to retain the moisture from exiting outwardly from the fowl. Consequently, the large outer surface of the fowl may become dry and tasteless. The cooking apparatus may not be moved by hand when hot unless insulating gloves or the like are used.

Another example is U.S. Pat. No. 6,125,739 issued to Jernigan which discloses a cooking device for supporting and steaming fowl within a cooking appliance such as a grill or smoker. The cooking device includes a horizontally disposed circular base plate to which an upstanding frusto-conical tubular insert affixed. The base plate seals a lower end of the insert. The insert includes a plurality of perforations from a midportion to an open upper end of the insert which is coverable using a removable domed cap. The insert is partially filled to the perforations with a basting liquid, the domed cap is replaced, and the insert placed into the body cavity of the fowl. Cooking device is placed on the cooking surface of the grill or smoker. Vapor produced within the insert is gradually disbursed through the perforations into the body cavity of the fowl to help prevent the fowl from drying. The cooking device appears to advantageously disperse the vapor over a larger area of the body cavity of the fowl, and is used within a closed-top grill or smoker which may retain some of the juices from evaporating from the meat. While the cooking device may be an improvement over the cooking apparatus of Guidry, the same basic drawbacks are present albeit possibly to a lesser degree. Additionally, only one fowl may be cooked at a time, requiring sequential time consuming cooking of multiple fowl to cook of a full meal such as several whole chickens, pheasants, ducks, or other smaller fowl, or multiple apparatuses to be used simultaneously.

Finally, in U.S. Pat. No. 6,272,976 issued to Berryman is disclosed a poultry steamer. The poultry steamer includes a base having a circular floor supported by a plurality of downwardly dependent legs and an upstanding perimeter wall. A removable support post extends upwardly from the center of the base for insertion into the body cavity of a whole fowl to support the fowl. A layer of sand is deposited in the base with a sheet of aluminum foil placed thereover. A removable cover of a much smaller diameter than the base fits over the fowl on the support post and engages the foil supported by the sand to semi-seal the fowl within the cover. Charcoal is layered in an annular space formed between the perimeter wall and the cover to heat the cover and cook the fowl therewithin. The cover is removed using a removable handle so as not to be hot during use. The cooking device appears to advantageously retain natural juices from the fowl around the fowl to lessen drying, but includes no way to add a basting liquid to supplement the natural juices. Likewise, it is virtually impossible to remove the cover to baste the fowl or to check whether the fowl is done and then replace the cover following basting or if the fowl is not fully cooked. Lifting the cover allows the hot charcoal to fall inwardly toward the support post and blocking replacement of the cover against the aluminum foil. The cooking device does not permit controlling of the cooking temperature and is not useable with conventional charcoal and gas-fired grills.

Therefore, there is a need for a cooking device for whole fowl which may be used with conventional gas-fired cookers or gas ranges, that shields the fowl from excessive heat, and which provides evenly distributed, controllable heat to evenly cook the fowl. The cooking device should retain the natural juices from the fowl around the fowl, steaming and roasting the fowl to preserve the taste of the meat and lessen drying, and permit adding of a flavored or other basting liquid which vaporizes to supplement the natural juices. The cooking device should allow cooking of a full meal at once, either a plurality of smaller fowl cooked at the same time or one large fowl. Finally, the cooking device should permit easy access to the fowl for basting and checking whether the meat is cooked properly, and is portable as a unitary device.

SUMMARY OF THE INVENTION

The present invention is a poultry roaster for use on top of a heat source, preferably a gas-fired cooker, so the heat input to the poultry roaster may easily be controlled. The poultry roaster includes a cover assembly which has a barrel-shaped cover with a circular upper wall and a downwardly dependent outer wall terminating at an annular lower rim defining an inner cooking chamber of the cover. At least one handle is affixed to the cover to facilitate lifting. A bottom pan has a circular bottom wall and an upwardly dependent peripheral rim adapted to receive the lower rim of the cover. The bottom wall has a plurality of lower heat distribution holes therethrough which are upwardly punched to form respective upwardly tapered annular grease dams around the lower heat distribution holes. A heat deflector made of a thermally conductive material has a horizontally disposed circular plate to which at least one meat holder is affixed adapted to hold a piece of meat such as a whole fowl. The meat holder is preferably an upstanding basting adapter made of a thermally conductive material which is affixable to the circular plate. The basting adapter is adapted to hold a can of basting liquid to be inserted into a body cavity of at least one whole fowl during cooking of the whole fowl. The circular plate has a plurality of upper heat distribution holes therethrough and is supported by the bottom pan in a spaced sealed relationship to the bottom wall forming a heat diffuser chamber therebetween. The heat diffuser chamber mixes heat from hotter and cooler portions of the heat source to provide a more even flow of heat upwardly from the heat source to the inner cooking chamber of the cover.

In a preferred embodiment of the poultry roaster, the cover is designed to resemble a beer keg with the outer wall being annularly ribbed or smooth. The handle is affixed centrally to the upper wall of the cover, and includes a pair of vertical posts that are affixed in a spaced relationship at respective lower ends to the upper wall and interconnected at respective upper ends by a transverse hand grip. A pair of simulated beer taps are affixed to respective of the upper ends of the vertical posts facing oppositely. The cover is retainable to the bottom pan by at least one retaining device. The cover includes a vent control disk that is rotatably connected to the upper wall thereof, the disk having a vent hole which is selectively overlappable with a vent hole through the upper wall. A thermometer hole extends through the upper wall for insertion of a thermometer to monitor the temperature within the inner cooking chamber of the cover.

A first preferred basting adapter comprises a single basting adapter for cooking a single larger size whole fowl. The single basting adapter includes a horizontally disposed base plate made of a thermally conductive material to which a plurality of upwardly dependent can retainer rods made of a thermally conductive material are affixed supporting an upper ring. The retainer rods and the upper ring are sized to receive the can of basting liquid to be inserted into the body cavity of the whole fowl prior to cooking to steam the whole fowl during cooking.

A second preferred basting adapter comprises a tri-basting adapter for cooking three smaller size whole fowl. The tri-basting adapter includes a horizontally disposed tri-arm base plate made of a thermally conductive material to which three upwardly dependent short can retainer tubes made of a thermally conductive material are affixed. The retainer tubes are sized to receive the can of basting liquid to be inserted into the body cavity of the whole fowl prior to cooking to steam respective of the whole fowl during cooking.

THE DRAWINGS

Figure 2:
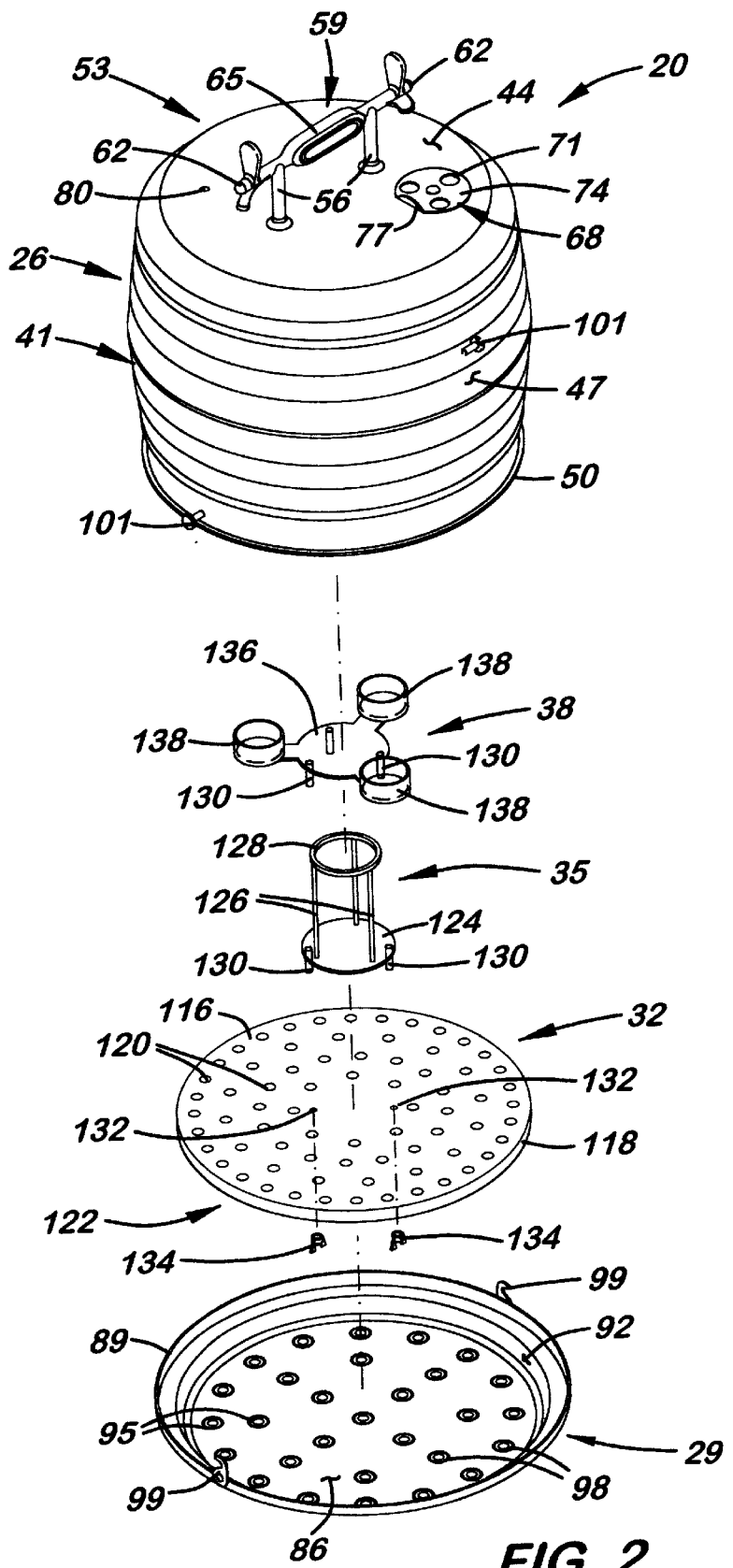
Figure 3:
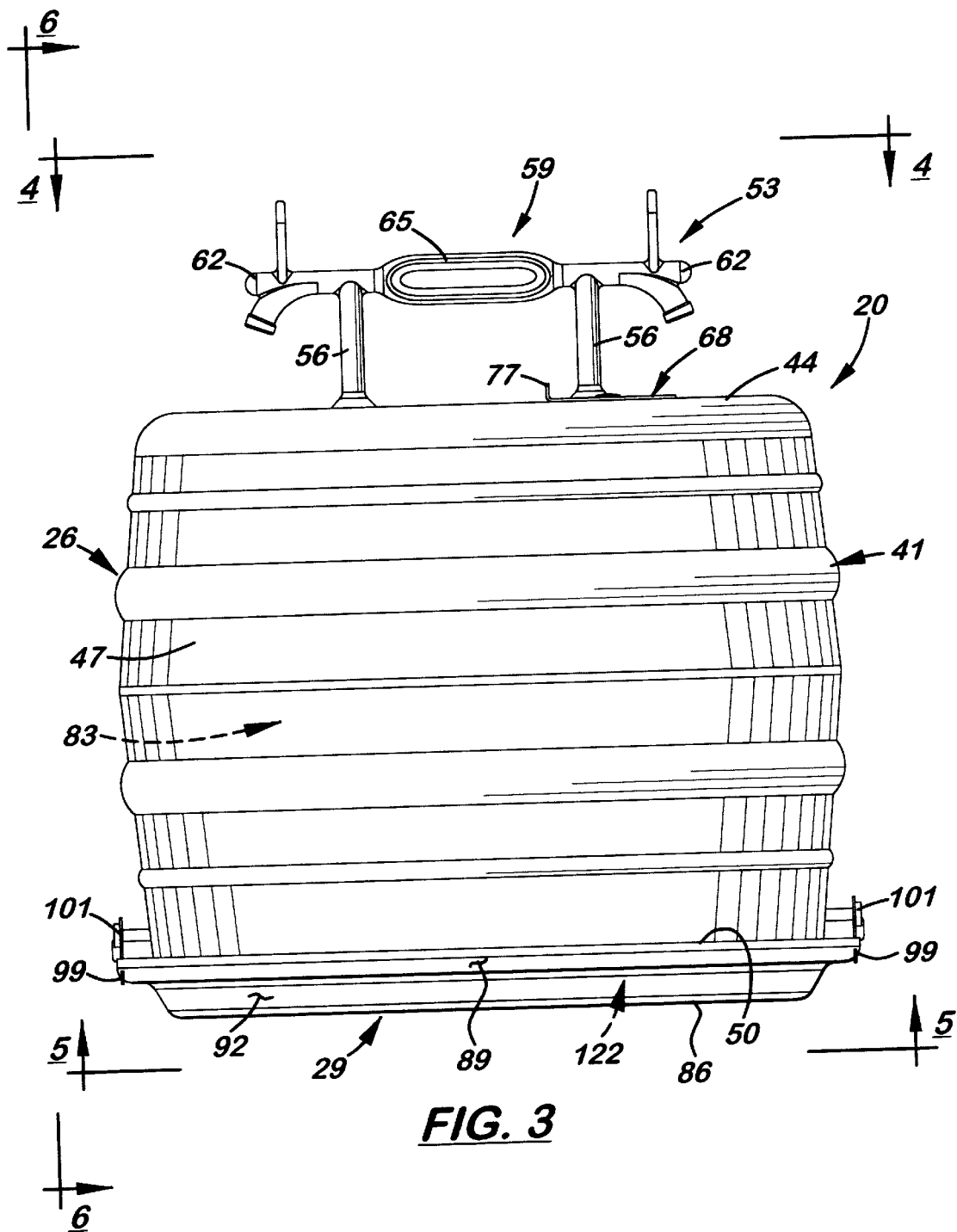
Figure 4:
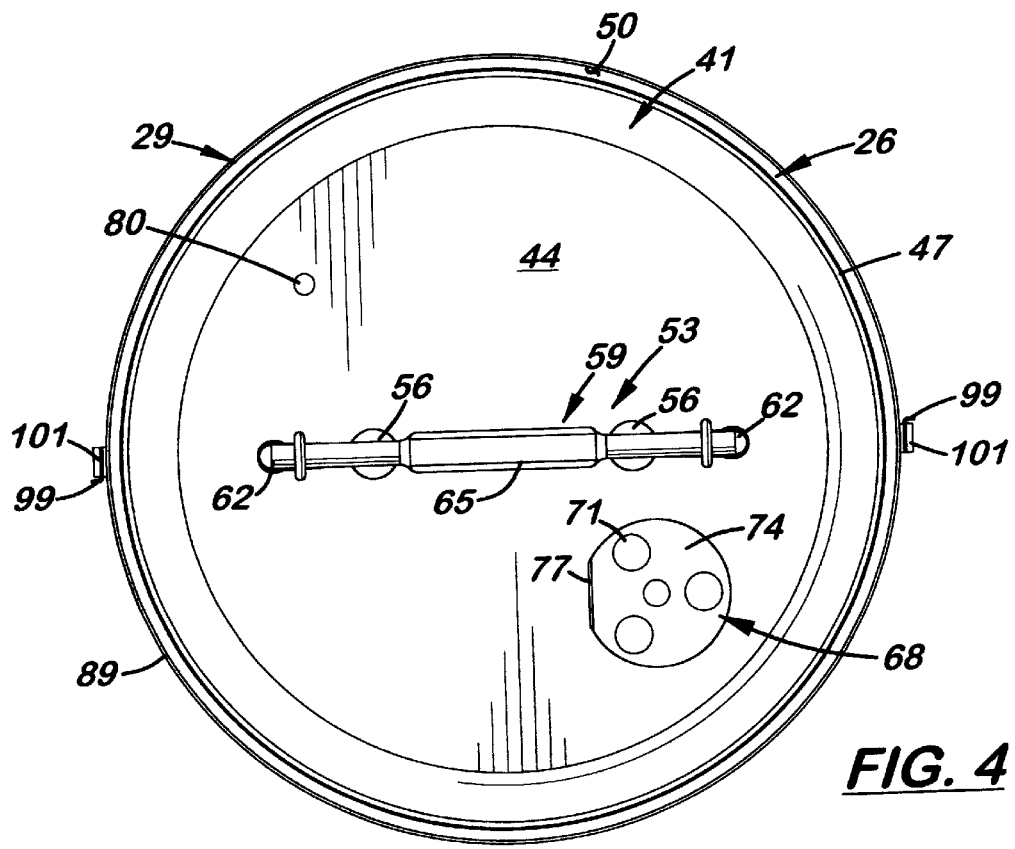
Figure 5:
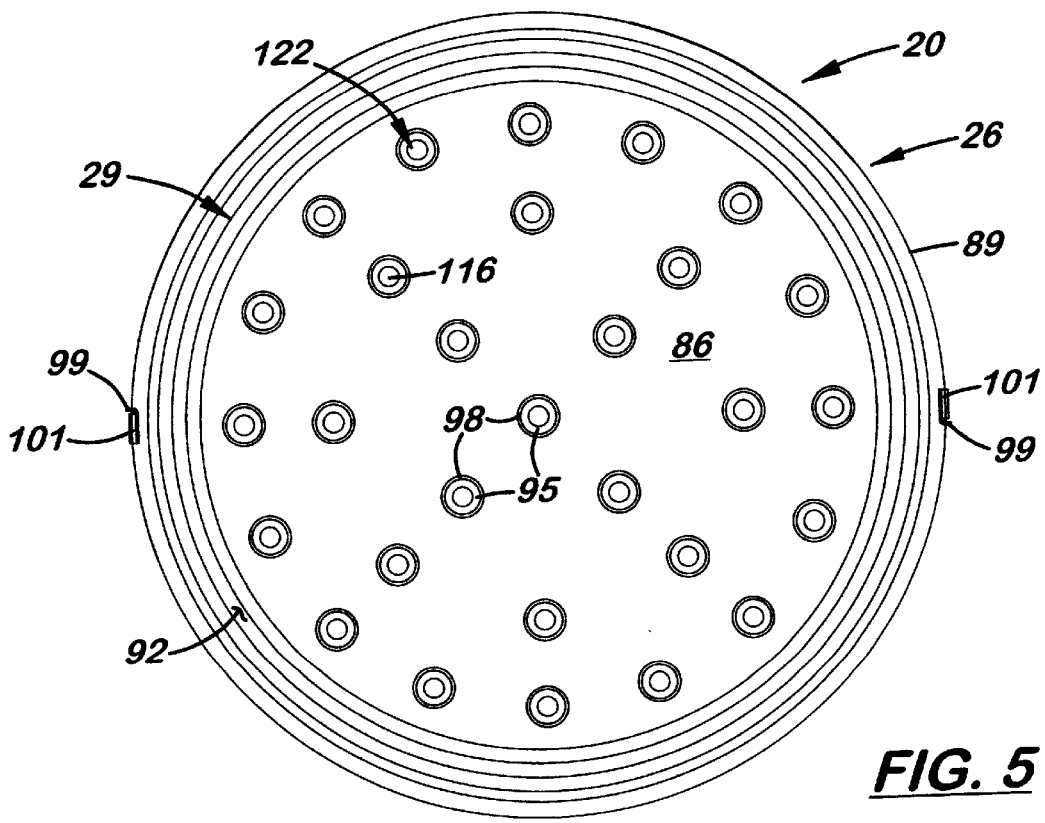
Figure 6:
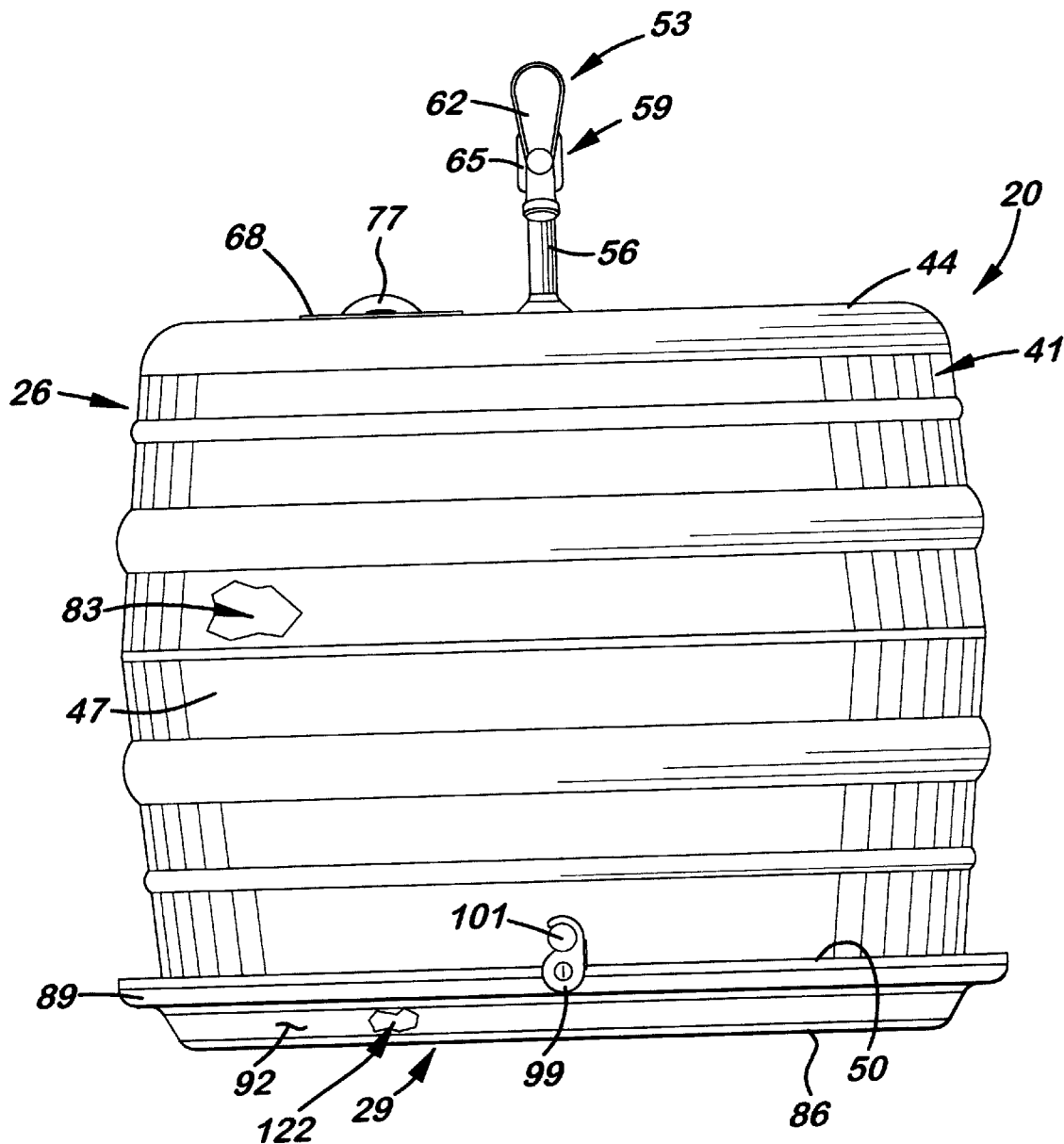

The best mode presently contemplated for carrying out the invention is illustrated in the accompanying drawings, in which:

FIG. 1 is a perspective view of a poultry roaster of the present invention as used atop a conventional gas-fired cooker;

FIG. 2, an exploded perspective view of the poultry roaster separate from the cooker, showing the cover assembly, the bottom pan, the heat deflector, the single basting adapter, and the tri-basting adapter;

FIG. 3, a front elevational view of the poultry roaster, showing the cover and handle which are designed to resemble a beer keg with a pair of upstanding beer taps;

FIG. 4, a top plan view of the poultry roaster taken on the line 4—4 of FIG. 3, showing the vent control disk and the thermometer hole;

FIG. 5, a bottom plan view of the poultry roaster taken on the line 5—5 of FIG. 3, showing the plurality of upwardly punched lower heat distribution holes with annular grease dams; and FIG. 6, a side elevational view of the poultry roaster taken on the line 6—6 of FIG. 3, showing the latch hooks engaging the headed pins to secure the cover assembly to the bottom pan.

DETAILED DESCRIPTION OF THE ILLUSTRATED EMBODIMENTS

In FIGS. 1–6 is shown a poultry roaster in accordance with the present invention, designated generally at 20, as positioned on a standard gas-fired cooker 23 so the heat input to poultry roaster 20 may easily be controlled.

The poultry roaster 20 includes a cover assembly 26 designed to resemble a beer keg with upstanding beer taps, a drip catching bottom pan 29, a heat deflector 32, a single basting adapter 35, and a tri-basting adapter 38. The cover assembly 26 includes a barrel shaped cover 41 having a circular upper wall 44 and a downwardly dependent annularly ribbed outer wall 47 terminating at an outwardly dependent annular lower rim 50. The cover 41 is designed to resemble a beer keg, with the cover assembly 26 having a handle 53 which is centrally affixed to upper wall 44 and includes a pair of vertical posts 56 that are interconnected by a transverse hand grip 59. A pair of oppositely disposed simulated beer taps 62 are affixed to the vertical posts 56 and the hand grip 59. A central logo portion 65 of hand grip 59 may include advertising and the like. A conventional vent control disk 68 is rotatably connected to the upper wall 44 at a vent hole 71 therethrough which is selectively overlappable with a hole 74 of the disk 68 by gripping an upwardly disposed tab 77 in hand and rotating the disk 68 to a desired position. A thermometer hole 80 extends through the upper wall 44 for insertion of a thermometer (not shown) to monitor the temperature within an inner cooking chamber 83 containing one or more whole fowl (not shown) while cooking. A resilient grommet (not shown) made of a heat resistant material is preferably affixed within thermometer hole 80 to retain the thermometer in place.

The bottom pan 29 includes horizontally disposed, circular bottom wall 86 and a peripheral rim 89 that are interconnected by an annular tapered liquid deflecting portion 92. The bottom wall 86 includes a plurality of lower heat distribution holes 95 therethrough which are upwardly punched to form respective upwardly tapered annular grease dams 98 around the lower heat distribution holes 95. The lower rim 50 of the cover 41 closely engages the peripheral rim 89 of the bottom pan 29 with the liquid deflecting portion 92 directing liquids condensing on the cover 41 onto the bottom wall 86. The cover 41 is retained to the bottom pan 29 by a pair of retaining devices comprising a pair of latch hooks 99 pivotally attached such as by riveting diametrically opposite each other on the peripheral rim 89 which engage mating radially disposed headed pins 101 affixed such as by riveting to the cover 41 adjacent lower rim 50. The bottom pan 29 is sized to fit on an upper support surface 104 of a burner unit 107 of the cooker 23. The burner unit 107 is supported on a ground surface 110 by a pair of downwardly dependent, U-shaped leg assemblies 113.

The heat deflector 32 includes a horizontally disposed, circular plate 116 to which the single basting adapter 35 and the tri-basting adapter 38 are individually affixable to hold whole fowl in an upright position with a can of beer or other can containing a basting liquid disposed within a body cavity of the whole fowl. A downwardly disposed annular rim 118 extends from circular plate 116 which closely engages the bottom wall 86 immediately radially inwardly of the peripheral rim 89 of bottom pan 29. The circular plate 116 includes a plurality of upper heat distribution holes 120 therethrough which are staggered relative to the lower heat distribution holes 95 in any relative rotational orientation to bottom pan 29 such that grease and other liquids cannot drip through the upper heat distribution holes 120 and directly through the lower heat distribution holes 95. A heat diffuser chamber 122 is formed between the heat deflector 32 and bottom pan 29 to mix heat from hotter and cooler portions of the cooker 23 to provide a more even flow of heat upwardly from the cooker 23 to the inner cooking chamber 83 of cover 41.

The single basting adapter 35 is for cooking a single larger sized whole fowl such as a whole turkey, and includes a horizontally disposed circular base plate 124, and a plurality of upwardly dependent can retainer rods 126 supporting a centrally located upper ring 128. The rods 126 and ring 128 are preferably sized to receive a standard twelve ounce can of beer to be inserted into the body cavity of the larger whole fowl prior to cooking. The base plate 124 is secured to the circular plate 116 of the heat deflector 32 by a pair of threaded studs 130 affixed to and downwardly dependent from base plate 124 in register with a pair of mounting holes 132 through circular plate 116. A pair of wingnuts 134 thread onto studs 130 to retain single basting adapter 35 to heat deflector 32.

The tri-basting adapter 38 is for cooking a three smaller sized whole fowl such as whole chickens, pheasants, and the like, and includes a horizontally disposed tri-arm base plate 136 to which three upwardly dependent short can retainer tubes 138 are affixed. The tubes 138 are preferably sized to receive a standard twelve ounce can of beer and be inserted into the body cavities of the smaller whole fowl prior to cooking the fowl. The base plate 136 is secured to the circular plate 116 of the heat deflector 32 by a pair of the threaded studs 130 affixed to and downwardly dependent from base plate 136 in register with the pair of mounting holes 132 through circular plate 116. The pair of wingnuts 134 thread onto studs 130 to retain tri-basting adapter 38 to heat deflector 32.

The cover 41, the bottom pan 29, the heat deflector 32, the single basting adapter 35, and the tri-basting adapter 38 are all preferably made of a thermally conductive, corrosion-resistant material such as stainless steel, plated plain carbon steel, or aluminum. This allows heat to conductively flow from the cooker 23 through the bottom pan 29 and the heat deflector 32 to heat both the exterior and the interior of the whole fowl. Heat also flows by convection from the cooker 23 through the lower heat distribution holes 95, mixing in the heat diff-user chamber 122 to provide a more uniform temperature, through upper heat distribution holes 120 into the inner cooking chamber 83 to cook the fowl. The vent control disk 68 is used to control the flow rate of convection heat through the inner cooking chamber 83 by gripping the tab 77 in hand and rotating the vent control disk 68 to a desired position. The handle 53 is preferably made of cast aluminum and a hot pad (not shown) is used by the chef to grip handle 53 when hot. Alternatively the handle 53 may be molded from a thermally insulating material such as high temperature plastic, composites such as resin coated fiberglass, or metal reinforced ceramic material. This allows the cover assembly 26 to be lifted when hot without using the hot pad.

The poultry roaster 20 is used to roast a single large fowl such as a whole turkey using the single basting adapter 35, which is affixed to the heat deflector 32 by inserting the threaded studs 130 through the mounting holes 132 of the heat deflector 32 and assembling the wingnuts 134 thereto. A can of beer is opened and placed through the upper ring 128 to a position between the can retainer rods 126. Alternatively, a heat resistant can or cup (not shown) of a suitable size may be used by filling with a basting liquid such as bottled or draft beer, wine, water, or the like, and impaling the whole turkey onto the single basting adapter 35 such that the can of beer is disposed within the body cavity of the turkey. The single basting adapter 35 and the tri-basting adapter 38 are preferably designed to interchangeably accept the same cans or cups. The cover 41 is then secured to the bottom pan 29 engaging the latch hooks 99 with the mating headed pins 101 if the poultry roaster 20 is to be carried. The procedure may be carried out at a location remote from the cooker 23, such as in a kitchen, and then the entire poultry roaster 20 may by picked up using the handle 53 and carried to the cooker 23 as an integral unit. The bottom pan 29 is placed on the upper support surface 104 of the cooker 23. The gas flow of the cooker 23 may be adjusted as needed by turning a conventional gas flow knob 141 of the cooker 23 , and a thermometer periodically inserted into the thermometer hole 80 to monitor the temperature within the inner cooking chamber 83.

As the internal temperature within the inner cooking chamber rises 83 rises, the beer within the beer can held by the single basting adapter 35 rises past its boiling point, the beer evaporates to steam or vapor which flows through the body cavity of the turkey and out into the inner cooking chamber 83. This vapor augments the natural juices released from the turkey during cooking to maintain a humid cooking environment which maintains a constant cooking temperature throughout inner cooking chamber 83 and moistens the meat. The beer flavor evenly permeates the meat adding a distinctive flavor thereto. The cover 41 may be periodically lifted to check the cooking progress.

Heat conducted from the cooker 23 through the single basting adapter 35 to the body cavity of the turkey helps to cook the turkey evenly from the inside out. Drippings from the turkey fall onto the heat deflector 32, through the upper heat distribution holes 120, and onto the bottom pan 29. The drippings cannot fall directly onto the cooker 23 due to the offset or staggered arrangement of the upper heat distribution holes 120 relative to the lower heat distribution holes 95. The drippings are trapped by the bottom pan 29 and cannot fall through the lower heat distribution holes 95 onto the cooker 23 due to the annular grease dams 98. The bottom pan 29 and the heat deflector 32 shield the turkey from direct heat and flames from the cooker 23 to eliminate burning of the turkey. The heat deflector 32 thus acts as a grease collector, distributes the heat to obviate "hot spots," and blocks undesirable flaming which causes burning of the meat. The annular tapered liquid deflecting portion 92 of the bottom pan 29 inwardly directs drippings to help prevent inadvertent grease spills. After the meat has been cooked, the poultry roaster 20 may be carried back to the kitchen as an integral unit by engaging the latch hooks 99 with the respective headed pins 101, then disassembled for convenient washing.

The poultry roaster 20 is used to roast three smaller fowl such as chickens using the tri-basting adapter 38 which is affixed to the heat deflector 32 by inserting the threaded studs 130 through the mounting holes 132 of the heat deflector 32 and assembling the wingnuts 134 thereto. The procedure is essentially is the same as outlined above for the single basting adapter 35, except that three cans of beer are opened and placed into the respective can retainer tubes 138 on the tri-arm base plate 136. Alternatively, three heat resistant cups of the type described filled with the basting liquid such as beer, wine, water, or the like may be used. Three whole chickens are impaled onto the respective beer cans so as to be disposed within the body cavities of the whole chickens. The cover 41 is then secured to the bottom pan 29 by engaging the latch hooks 99 with the mating headed pins 101. Following placement on the cooker 23, the internal temperature within the inner cooking chamber rises 83 rises, and the temperature of the beer within the beer cans rises past the boiling point. The beer evaporates to vapor which flows through the body cavity of the chickens and out into the inner cooking chamber 83 to cook and flavor the chicken as explained previously for the whole turkey.

Modifications to the cooking-process include addition of wood chips which may be placed on the bottom pan 29 to provide a smoke flavor to the fowl. Other types of meat including beef and pork may be cooked on the poultry roaster 20 by suitably wrapping and tying the meat to the single basting adapter 35.

Various modifications may be made to the present invention while staying within the same inventive concept. For example, the cover may have a smooth outer wall rather than annularly ribbed. The single basting adapter may have the upper ring disposed at an angle relative to a longitudinal axis thereof to facilitate insertion into the body cavity of the whole fowl. The single basting adapter may be constructed using a single short can retainer tube rather than the can retainer rods and upper ring. Likewise, the tri-basting adapter may be constructed using the can retainer rods and upper rings. A glass window may be disposed over a cutout of the cover to allow the chef to monitor the cooking progress without needing to lift the cover.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A poultry roaster for use on top of a heat source such as a gas-fired cooker, comprising:
    a cover assembly which includes a barrel-shaped cover having a circular upper wall and a downwardly dependent outer wall terminating at an annular lower rim defining an inner cooking chamber of said cover, and at least one handle affixed to said cover to facilitate lifting;
    a bottom pan having a circular bottom wall and an upwardly dependent peripheral rim adapted to receive said lower rim of said cover, said bottom wall having a plurality of lower heat distribution holes therethrough which are upwardly punched to form respective upwardly tapered annular grease dams around said lower heat distribution holes; and
    a heat deflector made of a thermally conductive material having a horizontally disposed circular plate to which an upstanding basting adapter made of a thermally conductive material is affixable, being adapted to hold a can of basting liquid to be inserted into a body cavity of at least one whole fowl during cooking of the whole fowl, said circular plate having a plurality of upper heat distribution holes therethrough and supported by said bottom pan in a spaced sealed relationship to said bottom wall forming a heat diffuser chamber therebetween to mix heat from hotter and cooler portions of the grill to provide a more even flow of heat upwardly from the grill to said inner cooking chamber of said cover.

2. A poultry roaster according to claim 1, wherein the cover is retainable to the bottom pan by at least one retaining device.

3. A poultry roaster according to claim 2, wherein there are a pair of retaining devices comprising a pair of latch hooks pivotally attached diametrically opposite each other on the peripheral rim of the bottom pan adapted to engage mating radially disposed headed pins affixed to the cover adjacent the lower rim thereof.

4. A poultry roaster according to claim 1, wherein the upper heat distribution holes are staggered relative to the lower heat distribution holes in any relative rotational orientation of the heat deflector to the bottom pan such that grease and other liquids cannot drip through said upper heat distribution holes and directly through said lower heat distribution holes onto the grill.

5. A poultry roaster according to claim 1, wherein the basting adapter comprises a single basting adapter for cooking a single larger size whole fowl which includes a horizontally disposed base plate made of a thermally conductive material to which a plurality of upwardly dependent can retainer rods made of a thermally conductive material are affixed supporting an upper ring, said retainer rods and said upper ring being sized to receive the can of basting liquid to be inserted into the body cavity of the whole fowl prior to cooking to steam the whole fowl during cooking.

6. A poultry roaster according to claim 1, wherein the basting adapter comprises a tri-basting adapter for cooking three smaller size whole fowl which includes a horizontally disposed tri-arm base plate made of a thermally conductive material to which three upwardly dependent short can retainer tubes made of a thermally conductive material are affixed, said retainer tubes being sized to receive the can of basting liquid to be inserted into the body cavity of the whole fowl prior to cooking to steam respective of the whole fowl during cooking.

7. A poultry roaster according to claim 1, wherein the cover is designed to resemble a beer keg wherein the outer wall is annularly ribbed.

8. A poultry roaster according to claim 1, wherein the handle is centrally affixed to the upper wall of the cover.

9. A poultry roaster according to claim 8, wherein the handle includes at vertical post affixed at a lower end to the upper wall and a simulated beer tap affixed to an upper end thereof.

10. A poultry roaster according to claim 9, wherein the handle includes a pair of vertical posts that are affixed in a spaced relationship at respective lower ends to the upper wall and interconnected at respective upper ends by a transverse hand grip, and a pair of the simulated beer taps that are affixed to respective of said upper ends facing oppositely.

11. A poultry roaster according to claim 10, wherein the hand grip includes a centrally disposed logo portion.

12. A poultry roaster according to claim 1, wherein the heat deflector includes a downwardly disposed annular rim which extends from the circular plate and which closely engages the bottom wall of the bottom pan radially inwardly of the peripheral rim thereof.

13. A poultry roaster for use on top of a heat source such as a gas-fired cooker, comprising:

a cover assembly which includes a barrel-shaped cover having a circular upper wall and a downwardly dependent outer wall terminating at an annular lower rim defining an inner cooking chamber of said cover, and at least one handle affixed to said cover to facilitate lifting;

a bottom pan having a circular bottom wall and an upwardly dependent peripheral rim adapted to receive said lower rim of said cover, said bottom wall having a plurality of lower heat distribution holes therethrough which are upwardly punched to form respective upwardly tapered annular grease dams around said lower heat distribution holes; and a heat deflector having a horizontally disposed circular plate to which at least one meat holder is affixed adapted to hold a piece of meat such as a whole fowl, said circular plate having a plurality of upper heat distribution holes therethrough and supported by said bottom pan in a spaced sealed relationship to said bottom wall forming a heat diffuser chamber therebetween to mix heat from hotter and cooler portions of the grill to provide a more even flow of heat upwardly from the grill to said inner cooking chamber of said cover.

14. A poultry roaster for use on top of a heat source such as a gas-fired cooker, comprising:

a cover assembly which includes a barrel-shaped cover designed to resemble a beer keg, having a circular upper wall and a downwardly dependent annularly ribbed outer wall terminating at an annular lower rim defining an inner cooking chamber of said cover, and a handle affixed centrally to said upper wall to facilitating lifting, said handle including a vertical post affixed at a lower end to said upper wall and a simulated beer tap affixed to an upper end thereof;

a bottom pan having a circular bottom wall and an upwardly dependent peripheral rim adapted to receive said lower rim of said cover, said bottom wall having a plurality of lower heat distribution holes therethrough which are upwardly punched to form respective upwardly tapered annular grease dams around said lower heat distribution holes, said cover being retainable to said bottom pan by at least one retaining device; and a heat deflector made of a thermally conductive material having a horizontally disposed circular plate to which an upstanding basting adapter made of a thermally conductive material is affixable, being adapted to hold a can of basting liquid to be inserted into a body cavity of at least one whole fowl during cooking of the whole fowl, said circular plate having a plurality of upper heat distribution holes therethrough and supported by said bottom pan in a spaced sealed relationship to said bottom wall forming a heat diffuser chamber therebetween to mix heat from hotter and cooler portions of the grill to provide a more even flow of heat upwardly from the grill to said inner cooking chamber of said cover.

15. A poultry roaster according to claim 14, wherein the handle includes a pair of vertical posts that are affixed in a spaced relationship at respective lower ends to the upper wall and interconnected at respective upper ends by a transverse hand grip, and a pair of the simulated beer taps that are affixed to respective of said upper ends facing oppositely.

16. A poultry roaster according to claim 14, wherein the basting adapter comprises a single basting adapter for cooking a single larger size whole fowl which includes a horizontally disposed base plate made of a thermally conductive material to which a plurality of upwardly dependent can retainer rods made of a thermally conductive material are affixed supporting an upper ring, said retainer rods and said upper ring being sized to receive the can of basting liquid to be inserted into the body cavity of the whole fowl prior to cooking to steam the whole fowl during cooking.

17. A poultry roaster according to claim 14, wherein the basting adapter comprises a tri-basting adapter for cooking three smaller size whole fowl which includes a horizontally disposed tri-arm base plate made of a thermally conductive material to which three upwardly dependent short can retainer tubes made of a thermally conductive material are affixed, said retainer tubes being sized to receive the can of basting liquid to be inserted into the body cavity of the whole fowl prior to cooking to steam respective of the whole fowl during cooking.

18. A poultry roaster according to claim 14, wherein the cover includes a vent control disk that is rotatably connected to the upper wall thereof, said disk having a vent hole which is selectively overlappable with a vent hole through said upper wall.

19. A poultry roaster according to claim 14, wherein a thermometer hole extends through the upper wall for insertion of a thermometer to monitor the temperature within the inner cooking chamber of said cover.

* * * * *